United States Patent [19]

Willem

[11] 4,130,926
[45] Dec. 26, 1978

[54] METHOD OF PRODUCING A ROD ANCHORING STRUCTURE

[75] Inventor: Michel Willem, Vichy, France

[73] Assignee: Ceraver S.A., Paris, France

[21] Appl. No.: 769,807

[22] Filed: Feb. 17, 1977

[51] Int. Cl.² .......................................... B23P 17/00
[52] U.S. Cl. .............................. 29/421 M; 29/421 R;
   29/452; 29/458; 29/510; 29/517; 403/268;
   403/284
[58] Field of Search ................ 29/458, 460, 510, 517,
   29/421 M, 421 R, 452; 403/282, 284, 285, 265,
   267, 268

[56] References Cited

U.S. PATENT DOCUMENTS

| | | | |
|---|---|---|---|
| 2,183,791 | 12/1939 | Dunn | 403/282 X |
| 2,274,961 | 3/1942 | Horger | 29/458 |
| 2,375,574 | 5/1945 | Metheny et al. | 29/517 UX |
| 2,901,822 | 9/1959 | Hayden | 29/517 |
| 3,116,547 | 1/1964 | Nepple | 29/460 |
| 3,152,392 | 10/1964 | Coppack et al. | 29/517 |
| 3,735,473 | 5/1973 | Wilson | 29/421 M |

FOREIGN PATENT DOCUMENTS 20140  9/1913  United Kingdom ................ 403/285

Primary Examiner—Charlie T. Moon
Attorney, Agent, or Firm—Sughrue, Rothwell, Mion, Zinn and Macpeak

[57] ABSTRACT

Method of producing a rod anchoring structure particularly for use in high tension insulators. It comprises an assembly of a rod in an anchoring fixing. The end of the rod is fitted with a surrounding double ended wedge element having a neck and flaring in both directions along the rod away from the neck. This wedge element is then jammed in the anchoring fixing, either by deforming a sleeve tightly around the wedge element or by winding a filament tightly around it.

18 Claims, 5 Drawing Figures

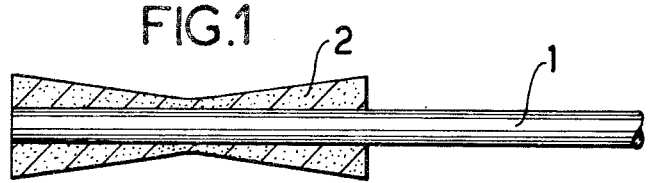
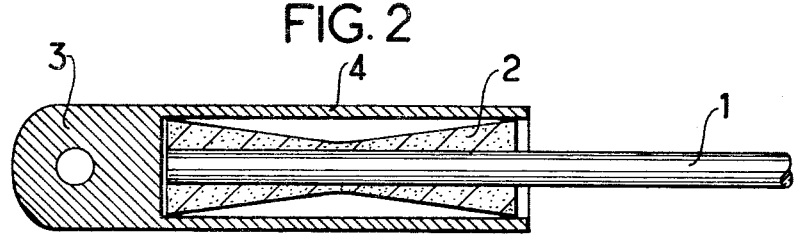
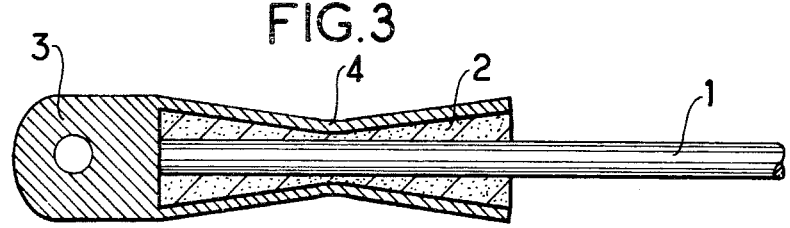
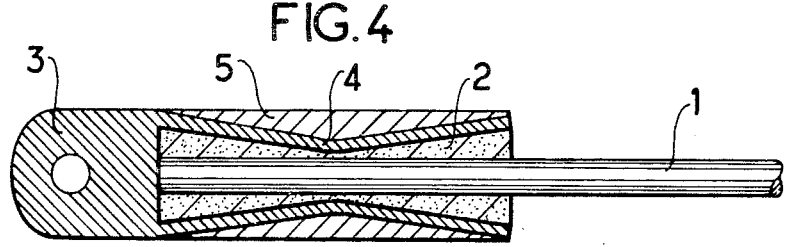
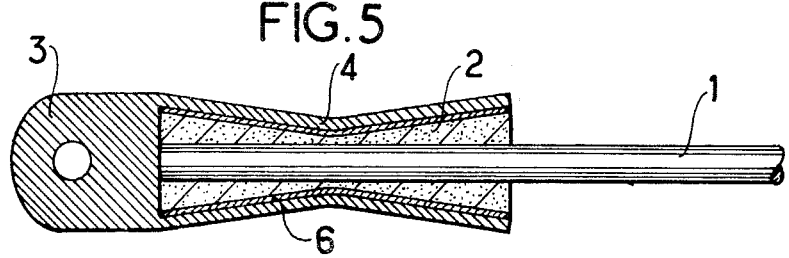

METHOD OF PRODUCING A ROD ANCHORING STRUCTURE

The present invention relates to an anchoring structure and to a method of producing one.

Such structures are particularly intended for use in insulators such as pylon stays as described in the parent application.

A difficulty occurs in the method of manufacture described in the parent application in relation to a wedge element which is moulded between an anchoring fitting in the form of a sleeve and a rod received therein. The wedge element is formed after the rod is received in the sleeve by pouring a substance such as resin into the gap between the rod and the sleeve and allowing the substance to set. Under such circumstances it is difficult to check that the wedge element is homogeneous and that it fills the gap entirely without leaving any spaces or air bubbles. Such spaces reduce the mechanical strength and also reduces the maximum voltage the anchoring structure can withstand. This is of importance in the high tension applications envisaged.

The present invention mitigates this drawback by providing a method which simplifies verification of the wedge element.

The present invention provides a method of producing a rod anchoring structure comprising the steps of fitting the edge of a rod with a surrounding, double-ended wedge element having a neck from which flared ends of increasing cross-sectional area extend in both axial directions along the rod and of so fitting the wedge element in an anchoring fitting that the wedge element is radially compressed by the anchoring fitting even in the absence of an axial load on the rod.

Preferably the anchoring fitting has an initial shape of an open-ended tubular sleeve in which the wedge-bearing end of the rod is received and which is subsequently deformed into an open-ended nozzle-shaped sleeve pressing tightly against the wedge element.

Alternatively the anchoring fitting is formed by winding a filament of suitable material such as metal wire or resin-impregnated organic fibre around the wedge element.

The wedge element may have an axial pretensioning applied thereto during the fitting of the anchoring fitting.

The wedge element may be made of resin which is preferably moulded onto the end of the rod in a mould for producing the desired shape to avoid subsequent machining or trimming. Advantageously the rod is made of resin agglomerated fibres and the wedge element is moulded onto the rod before the resin of the rod has completely polymerized, thereby improving adhesion between the rod and the wedge element.

The present invention also provides a rod anchoring structure produced by the method.

Embodiments of a rod anchoring structure embodying the present invention are described by way of example with reference to the accompanying drawing in which:

FIG. 1 shows a rod with a wedge element thereon;

FIG. 2 shows a sleeve anchoring fitting receiving the wedge element and before being pressed onto it;

FIG. 3 shows the fitting of FIG. 2 after being pressed onto the wedge element;

FIG. 4 shows a fitting analogous to the one of FIG. 3, also comprising a hoop or strapping around the middle part of the sleeve; and FIG. 5 shows a fitting analogous to the one of FIG. 3, also comprising a thin sleeve of soft ductile metal between the wedge element and the sleeve.

In FIG. 1, a rod 1 made of resin-agglomerated glass fibres is embedded at one end in a wedge element 2 of resin which is full of an aggregate such as grains of silica and/or fibres and which has a double truncated-cone or "diabolo" shape. The wedge element 2 is moulded onto the end of the rod 1 in a two part mould (not shown). After polymerization of the resin mould is opened and the rod 1 together with its fitted wedge element 2 are removed, which makes it easy to verify the condition of the resin of the wedge element 2. To ensure a better connection between the rod 1 and the resin wedge element 2, it is possible to start with an incomplete polymerization of the resin of the rod 1 before the moulding of the wedge element 2 thereto, and then allow the polymerization to finish after the moulding of the aggregated resin.

An anchoring fitting is then applied to the wedge element 2 in order to complete the anchoring of the end of the rod 1. The initial shape of this fitting is shown in FIG. 2. It comprises a cylindrical sleeve 4 which is open at one end and closed at the other end by an end portion 3 which includes an eye for fixing the rod to a support. The bore diameter of the sleeve 4 is slightly greater than the maximum diameters of the wedge element 2. The wedge element 2 is inserted into the sleeve 4 which is than deformed around the neck of the wedge element 2 to become a tight fit. The deformation may be by forging, by a cold working method such as rolling or, when a relatively thin sleeve of ductile metal such as aluminium is used, by isostatic pressing inside a pressurized elastomeric casing or by magnetic crimping. The anchoring element shown in FIG. 3 is thus obtained.

If greater strength is required for the anchoring fitting, the sleeve 4 may be made of steel (or any other metal having high mechanical strength) and should be pressed against the wedge element 2 in the region of the neck and then (or preferably simultaneously) on either side thereof.

The mechanical strength of the anchoring fitting can be further reinforced by strapping the deformed sleeve (FIG. 4). The deformed sleeve can be strapped in the usual way by winding a metal wire round it or even by casting an exterior sleeve 5 made of an alloy having a moderate melting point, such as an aluminium alloy.

To be more certain of preventing any inclusion of air between the wedge element 2 and the bore of the sleeve 4 it is advantageous to cover the preformed resin wedge element 2 with a protective layer 6 made of a soft ductile metal such as aluminium.

One advantage of pressing the sleeve 4 onto the resin wedge element 2 is that the progressive deformation of the sleeve 4 on either side of the neck can be made to provoke a condition of permanent tensile stress with its resultant in the axial direction between the wedge element 2 and the sleeve 4. This stress contributes to pressing the two conical parts of the wedge element 2 against the nozzle-shaped bore of the sleeve 4. When the rod 1 is subsequently subjected to longitudinal traction, there is no displacement of the wedge element 2 in relation to the nozzle for as long as there remain compression stresses at the wedge-nozzle interface on the side on which the traction is applied (i.e. on the side which is progressively releaved of stress by the applied traction). This effect can further be accentuated by subjecting the rod 1 and consequently the resin wedge element 2 to a traction during the forming of the sleeve 4 about the wedge element 2. For this purpose it is advantageous firstly to press the part of the sleeve 4 which is closest to the end of the rod 1, up to the neck, then to apply traction to the rod 1 from its opposite end and then to continue the pressing of the sleeve 4 over the other half of the wedge element 2.

Although the variants of embodiment of the improved structure, as well as their manufacturing methods, which have just been described, appear preferable, it will be understood that various modifications can be made thereto without going beyond the scope of the invention, it being possible to replace some elements or some operations by others which would still fall within the scope of the claims. In particular the anchoring fitting could be formed by winding a filament or thread of suitable material around the wedge element 2. The filament should be tightly bound to provide the required compressive stress in the wedge element. Suitable materials include metal wires or ropes and resin bounded fibres.

What we claim is:

1. A method of producing a rod anchoring structure comprising the steps:
   molding onto the end of a rod a surrounding, double-ended wedge element having a neck from which flared ends of increasing cross-sectional area extend in both axial directions along the rod, and
   concentrically mounting to said wedge element an anchoring fitting with said anchoring fitting radially compressing said wedge element over said neck and said flared ends in the absence of an axial load on the rod.

2. A method according to claim 1, wherein said anchoring fitting has an initial shape of an open-ended tubular sleeve in which the wedge element-bearing of tht rod is received and said step of concentrically mounted said anchoring fitting to said wedge element comprises deforming said open-ended nozzle-shaped sleeve press tight against the wedge element.

3. A method according to claim 2, wherein said sleeve is formed of thin ductile metal and said deforming step comprises isostatic pressing of said sleeve onto said wedge element.

4. A method according to claim 2, wherein said sleeve is formed of thin ductile metal and said step of deforming said sleeve comprises magnetic crimping of said sleeve onto said wedge element.

5. A method according to claim 2, wherein said sleeve is formed of a high mechanical strength metal and said step of deforming said sleeve comprises cold working of said sleeve to press said sleeve onto said wedge element.

6. A method according to claim 2, wherein said sleeve is formed of a high mechanical strength metal and said step of deforming said tubular sleeve comprises forging said sleeve onto said wedge element.

7. A method according to claim 5, wherein the wedge element is covered with a layer of soft metal before having the sleeve pressed onto it.

8. A method according to claim 2, further comprising the step of strapping said sleeve at least in the vicinity of the neck after fitting of said sleeve to said wedge element.

9. A method according to claim 8, wherein said sleeve is made of metal and said step of strapping said sleeve in the vicinity of the neck comprises moulding an exterior sleeve of a metal of lower melting point than said sleeve to said sleve.

10. A method according to claim 8, wherein said step of strapping of said sleeve comprises winding a metal wire around said sleeve.

11. A method according to claim 1, wherein the anchoring fitting is formed by winding a filament around the wedge element.

12. A method according to claim 11, wherein the filament is a metal wire.

13. A method according to claim 11, wherein the filament is a resin-impregnated organic fibre.

14. A method according to claim 2, wherein said step of deforming said tubular sleeve into an open-shaped nozzle-shaped sleeve against the wedge element comprises initially deforming said fitting about the neck of the wedge element and subsequently deforming the remainder of said fitting against said flared ends.

15. A method according to claim 14, wherein said deformation of said fitting onto said wedge element is progressively away from said neck and towards either side thereof.

16. A method according to claim 2, further comprising the step of applying an axial force to the rod during deforming of said tubular sleeve to provide a degree of axial pre-tensioning between the two halves of the wedge element and the anchoring fitting.

17. A method according to claim 16, wherein the anchoring fitting is initially fitted tightly to the half of the wedge element which is nearest to the end of the rod, the rod is then subject to traction away from the fitted end and the other anchoring fitting is tightened around the other half of the wedge element while the rod is subject to the traction.

18. A method according to claim 2, wherein said rod is made of resin-agglomerated fibres, said wedge element is moulded of resin, and said step of moulding of said wedge element comprises the moulding of said wedge element of resin before the resin of the rod has completely polymerized.

* * * * *